US011604747B2

(12) United States Patent
Sisterhen et al.

(10) Patent No.: US 11,604,747 B2
(45) Date of Patent: Mar. 14, 2023

(54) PROGRAMMABLE HARDWARE VIRTUAL NETWORK INTERFACE

(71) Applicant: NATIONAL INSTRUMENTS CORPORATION, Austin, TX (US)

(72) Inventors: Patrick Karl Sisterhen, Cedar Park, TX (US); Ashish S. Chaudhari, San Jose, CA (US); Moritz Daniel Fischer, Santa Clara, CA (US); Daniel Paul Jepson, Austin, TX (US); Hector M. Rubio, Austin, TX (US); Andrew Michael Lynch, Austin, TX (US); Klaus Martin Braun, Eggenstein-Leopoldshafen (DE); Antonia Marie Walls Jones, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 17/034,726

(22) Filed: Sep. 28, 2020

(65) Prior Publication Data
US 2021/0349842 A1 Nov. 11, 2021

Related U.S. Application Data

(60) Provisional application No. 63/022,148, filed on May 8, 2020.

(51) Int. Cl.
*G06F 13/28* (2006.01)
*G06F 13/40* (2006.01)

(52) U.S. Cl.
CPC .......... *G06F 13/28* (2013.01); *G06F 13/4027* (2013.01)

(58) Field of Classification Search
None
See application file for complete search history.

(56) References Cited

U.S. PATENT DOCUMENTS 5,887,164 A * 3/1999 Gupta ................... G06F 9/4406
709/222
7,457,861 B1 11/2008 Ebersole et al.
(Continued)

OTHER PUBLICATIONS

David Hinkle, "Multiple Node Networking Using PCIe Interconnects", Aug. 1, 2016, pp. 1-3 <https://www.aerodefensetech.com/component/content/article/adt/features/articles/25240> (Year: 2016).*

*Primary Examiner* — Idriss N Alrobaye
*Assistant Examiner* — Dayton Lewis-Taylor
(74) *Attorney, Agent, or Firm* — Kowert, Hood, Munyon, Rankin & Goetzel, P.C.; Jeffrey C. Hood; Brian E. Moore

(57) ABSTRACT

Systems and methods for communication between heterogenous processors via a virtual network interface implemented via programmable hardware and one or more buses. The programmable hardware may be configured with a multi-function bus such that the programmable hardware appears as both a network device and a programmable device to a host system. Additionally, the programmable hardware may be configured with a second bus to appear as a network device to an embedded system. Each system may implement network drivers to allow access to direct memory access engines configured on the programmable hardware. The configured programmable hardware and the network drivers may enable a virtual network connection between the systems to allow for information transfer via one or more network communication protocols.

20 Claims, 6 Drawing Sheets

(56) References Cited

U.S. PATENT DOCUMENTS

| | | |
|---|---|---|
| 7,581,033 B2 | 8/2009 | Ebersole et al. |
| 8,874,681 B2 | 10/2014 | Aho et al. |
| 9,965,417 B1* | 5/2018 | Azad .................... G06F 12/1081 |
| 2011/0035516 A1* | 2/2011 | Liu ..................... G06F 13/4022 |
| | | 710/40 |
| 2017/0075855 A1* | 3/2017 | Sajeepa ............. G06F 15/17331 |

* cited by examiner

Providing, by a network driver, a virtual network connection to an embedded system via programmable hardware
402

Communicating, over a bus interface with the programmable hardware, with the embedded system via a network protocol
404

*Figure 4*

Providing, by a network driver, a virtual network connection to a host system via an programmable hardware
502

Communicating, over a bus interface with the programmable hardware, with the host system via a network protocol
504

*Figure 5*

Receive, via a first bus interface, data from a first system, wherein the data is transferred via a network protocol
602

Transfer, via a second bus interface, the data to a second system via the network protocol
604

*Figure 6*

PROGRAMMABLE HARDWARE VIRTUAL NETWORK INTERFACE

PRIORITY INFORMATION

This application claims benefit of priority to U.S. Provisional Application Ser. No. 63/022,148, titled "FPGA Virtual Network Interface", filed May 8, 2020, which is hereby incorporated by reference in its entirety as though fully and completely set forth herein.

FIELD OF THE INVENTION

The present invention relates to mechanisms to allow communication between heterogenous processors via a virtual network interface implemented via programmable hardware and one or more buses.

DESCRIPTION OF THE RELATED ART

In the industrial or embedded application field, systems often include both a processor unit (PS) and programmable logic unit (e.g., FPGA). However, when the programmable logic (PL) is connected to an x86 host system via a peripheral component interconnect express (PCIe) bus, there is no standard way to enable communication between the x86 host and an embedded processor unit (PS). Thus, in many applications, both the x86 host and the embedded processor unit may be required to include network interface cards to allow Ethernet connections between the systems, adding cost and complexity to both systems.

SUMMARY OF THE INVENTION

Embodiments relate to apparatuses, systems, and methods to mechanisms to allow communication between heterogenous processors via a virtual network interface implemented via programmable hardware and one or more buses.

The techniques described herein may be implemented in and/or used with a number of different types of devices, including but not limited to wireless devices, computer systems, programmable hardware (e.g., programmable circuits such as field programmable gate array fabrics (e.g., FPGAs)), x86 systems, and/or ARM systems.

In some embodiments, programmable hardware (e.g., such as a field programmable gate array (FPGA) fabric) may include multiple circuits. A first set of circuits (e.g., a first one or more circuits) may be configured as a first bus interface, a second set of circuits may be configured as a first direct memory access (DMA) engine, a third set of circuits may be configured as a second DMA engine, and a fourth set of circuits may be configured as a second bus interface. The first bus interface may be configured as (or include) a multi-function bus interface and the first DMA engine may be associated with a first (computer) system and may communicate (e.g., send and/or receive data) with the first system via the first bus interface. The first system may interface with the programmable hardware via the first bus interface. The first system may be considered a host system, at least in some embodiments. In such embodiments, the first system may operate based on an x86 processor architecture. The second DMA engine may be associated with a second (computer) system and may communicate (e.g., send and/or receive data) with the second system via the second bus interface. The second system may be considered an embedded system, at least in some embodiments. In such embodiments, the second system may operate according to a RISC processor architecture (e.g., such as an ARM processor architecture). The programmable hardware may be configured to receive, via a first path of the multi-function bus interface, first information from the first system into the first DMA engine. The first information may be received according to a network communications protocol. The programmable hardware may be configured to transfer the first information to the second DMA engine and send, to the second system, the first information via the second bus interface. The first information may be sent according to the network communications protocol. In some embodiments, the multi-function bus may allow the programmable hardware to appear as a network device and a programmable device to the first system. Similarly, the programmable hardware may be configured to receive, via the second bus interface, second information from the second system into the second DMA engine. The second information may be received according to the network communications protocol. The programmable hardware may be configured to transfer the second information to the first DMA engine and send, to the first system, the second information via the first path of the multi-function bus interface.

In some embodiments, a network driver (e.g., program instructions stored in memory and executable by a processor and/or processing circuitry) of a first (computer) system may be configured to provide a virtual network connection to a second (computer) system. In some embodiments, the first system and the second system may operate based on differing processor architectures and the virtual network connection may be via programmable hardware (e.g., such as a field programmable gate array (FPGA) fabric) in communication via bus interfaces with the first and second systems. The network driver may be configured to send, via a network communications protocol, first information to the second system via the programmable hardware. The programmable hardware may implement a multi-function bus interface such that the programmable hardware presents as a network interface and a programmable device to the first system. The first system may be considered a host system, at least in some embodiments. In such embodiments, the first system may operate based on an x86 processor architecture. The second system may be considered an embedded system, at least in some embodiments. In such embodiments, the second system may operate based on a RISC processor architecture (e.g., such as an ARM processor architecture).

In some embodiments, a network driver (e.g., program instructions stored in memory and executable by a processor and/or processing circuitry) of a first (computer) system may be configured to provide a virtual network connection to a second (computer) system. In some embodiments, the first system and the second system may operate based on differing processor architectures and the virtual network connection may be via programmable hardware (e.g., such as a field programmable gate array (FPGA) fabric) in communication via bus interfaces with the first and second systems. The network driver may be configured to send, via a network communications protocol, first information to the second system via the programmable hardware. The first system may be considered an embedded system, at least in some embodiments. In such embodiments, the first system may operate based on a RISC processor architecture (e.g., such as an ARM processor architecture). The second system may be considered a host system, at least in some embodiments. In such embodiments, the second system may operate based on an x86 processor architecture.

This Summary is intended to provide a brief overview of some of the subject matter described in this document.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which:

FIGS. 4, 5 and 6 illustrate block diagrams of examples of methods for communicating between heterogenous processors via programmable hardware, according to some embodiments.

Figure 1:
FIG. 1 illustrates an example of a block diagram of heterogeneous processors in communication via programmable hardware, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware or Programmable Hardware Element—includes various hardware devices comprising multiple programmable function blocks connected via a programmable interconnect. Examples include FPGAs (Field Programmable Gate Arrays), FPGA fabrics, PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic" and/or "programmable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

FPGA—refers to an integrated circuit (IC) that can be programmed in the field after manufacture. In other words, an IC that can be customized for a specific application. An FPGA may contain programmable logic blocks that can be wired (configured) in different configurations. These blocks create a physical array of logic gates that can be used to perform different operations.

PCIe (or PCI-e)—refers to a high-speed serial computer expansion bus standard. As compared to prior PCI standards, PCIe allows higher maximum system bus throughput, lower I/O pin count and smaller physical footprint, better performance scaling for bus devices, a more detailed error detection and reporting mechanism, and native hot-swap functionality.

x86—refers to an instruction set architecture (ISA) series for computer processors. x86 architecture defines how a processor handles and executes different instructions passed from the operating system (OS) and software programs.

ARM—refers to an Advanced RISC machine (or an Acorn RISC machine). This family of machines are based on reduced instruction set computing (RISC) architectures for computer processors.

Internet Protocol (IP)—refers to the networking model and a set of protocols for communication used for networks such as the Internet.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Although the embodiments above have been described in considerable detail, numerous variations and modifications will become apparent to those skilled in the art once the above disclosure is fully appreciated. It is intended that the following claims be interpreted to embrace all such variations and modifications.

Programmable Logic Virtual Network Interface

As noted above, embedded systems often contain both a processor unit or embedded processor (PS) and an FPGA or programmable logic unit (PL). In many applications, when the PL is connected to a x86 host system via a PCIe bus, there is no standard way to enable communication between the x86 host and the embedded processor (PS).

Embodiments described herein provides mechanisms to setup a path for the processors to communicate with each other via network interfaces without requiring network interface cards (NICs) on each device. In some embodiments, a virtual network connection (VNC) may be provided between heterogeneous processors (e.g., an x86 processor on a host system and an ARM processor (e.g., a processor based on a RISC (reduced instruction set computing) architecture) on an embedded system), e.g., via a Peripheral Component Interconnect express (PCIe) bus, a programmable hardware element (e.g., such as an FPGA fabric and/or other programmable logic), and Advanced eXtensible Interface (AXI) buses. In some embodiments, the VNC may allow applications on each processor to communicate via standard network application programming interfaces (APIs), e.g., without requiring corresponding hardware (e.g., network interface cards (NICs)) and/or Ethernet cabling between the host system and the embedded system.

Note that in some embodiments, a programmable hardware element and/or programmable hardware may include various hardware devices that may include multiple programmable function blocks connected via a programmable interconnect. For example, a programmable hardware element may be and/or include FPGAs (Field Programmable Gate Arrays), FPGA fabrics, PLDs (Programmable Logic Devices), FPOAs (Field Programmable Object Arrays), and/or CPLDs (Complex PLDs). In some embodiments, the programmable function blocks may range from fine grained (combinatorial logic or look up tables) to coarse grained (arithmetic logic units or processor cores). In some embodiments, a programmable hardware element may also be referred to as "reconfigurable logic" and/or "programmable logic".

FIG. 1 illustrates an example of a block diagram of heterogeneous processors in communication via programmable hardware (and/or a programmable hardware element and/or programmable logic), according to some embodiments. As shown, programmable hardware 100 may be in communication with a host system 120 via a bus 115 and an embedded system 140 via a bus 105. In some embodiments, the programmable hardware 100 may be local to the host system 120. In some embodiments, the programmable hardware 100 may be local to the embedded system 140. In some embodiments, the programmable hardware 100 may be a stand-alone unit. In some embodiments, the programmable hardware 100 may be configured to allow communication between the embedded system 140 and the host system 120 via any supported network protocol, including, but not limited to, user datagram protocol (UDP), transmission control protocol/Internet protocol (TCP/IP) sockets, remote procedure calls (RPC), secure shell (SSH), and so forth.

In some embodiments, each of the host system 120 and embedded system 140 may include a network driver that may be configured as a bridge between a direct memory access engine included (or implemented on) the programmable hardware 100 and an operating system network stack. The network driver may be configured to provide functionality for one or more of device enumeration by operating system (OS) services, device configuration by operating system (OS) services, device configuration by applications, and/or data transfer between the OS network stack and device hardware. In some embodiments, the network driver may include (or implement) driver and OS network stack interfaces such that the network driver may function as both a network device driver in a targeted OS and as an abstraction layer such that the OS and applications may perceive the programmable hardware 100 as a network device and as a programmable device.

In some embodiments, programmable hardware 100 may include components (e.g., programmable and/or configurable circuitry) configured as a multifunction bus interface and programmable logic-based direct memory access (DMA) interface, e.g., such that a connected system (e.g., such as host system 120) may perceive programmable hardware 100 as multiple devices, e.g., as a network device and as a programmable device. For example, in some embodiments, the multifunction bus interface may expose the DMA engine included (or configured) on the programmable hardware to allow transferring of data to and from the connected systems (e.g., the host system and the embedded system).

In some embodiments, the host system 120 and/or embedded system 140 may be configured to deploy a program to programmable hardware 100 for execution of the program on the programmable hardware 100. In some embodiments, source code of the deployed program may be a graphical representation in the form of graphical program instructions or data structures that directly represents the graphical program. Alternatively, and/or additionally, the deployed program source code may take the form of text code (e.g., C code). In some embodiments, the source code may include components to enable virtual network communication between host system 120 and embedded system 140, in addition to any other source code.

In some embodiments, programmable hardware 100 may be in the form of a heterogeneous system on a chip SOC (HSOC). In some embodiments, programmable hardware 100 may be a hybrid digital signal processor (DSP)/FPGA/microprocessor SOC. In some embodiments, the HSOC may include programmable hardware, e.g., one or more programmable hardware elements, such as an FPGA fabric, one or more DSP cores, one or more microprocessors and/or GPUs, as well as both internal and external programmable communication elements.

In some embodiments, programmable hardware 100 may be a heterogeneous system that includes multiple SOCs, including both homogeneous SOCs and heterogeneous SOCs. For example, programmable hardware 100 may include multiple HSOCs, a homogeneous microprocessor chip, a homogeneous DSP chip, a homogeneous FPGA chip, and a homogeneous GPU (graphical processing unit) chip.

Figure 2:
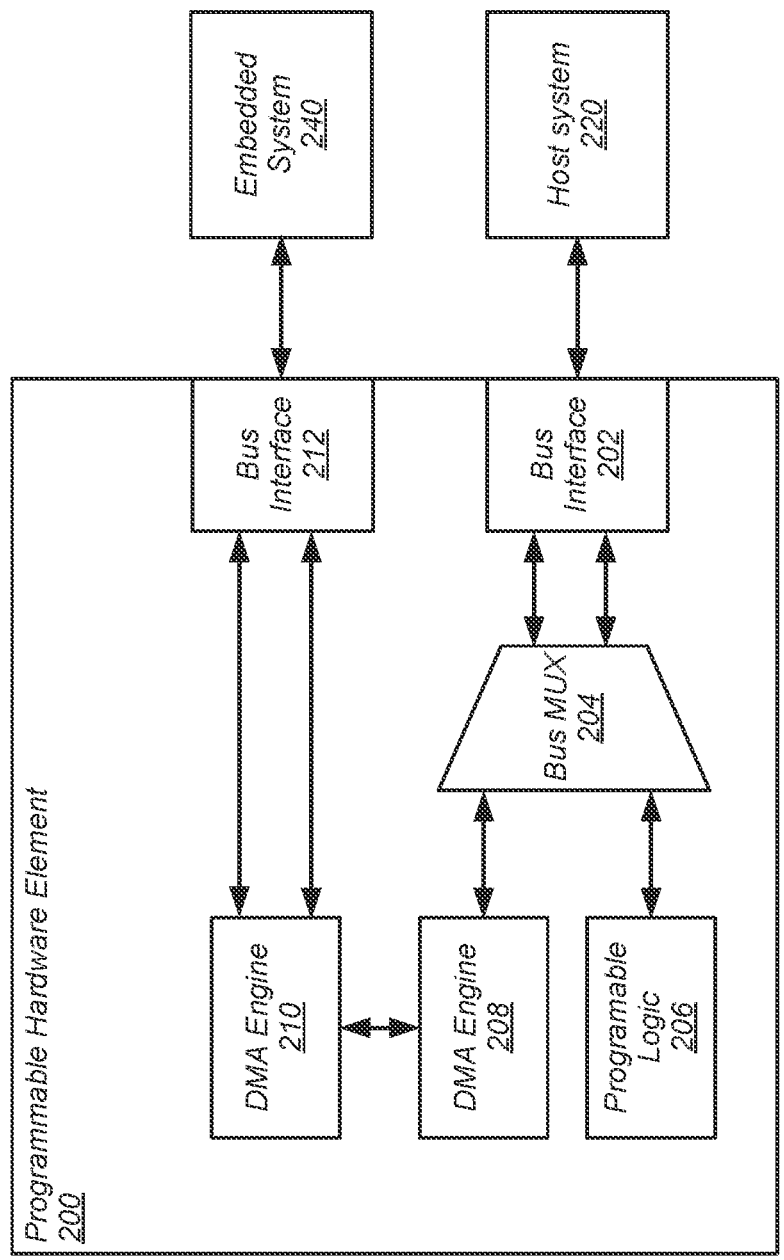
FIG. 2 illustrates an example of a block diagram of programmable hardware, according to some embodiments.

FIG. 2 illustrates an example of a block diagram of a programmable hardware element, according to some embodiments. The programmable hardware element 200, which may be programmable hardware 100, may enable setup of a path for processors within host system 220 to communicate with processors within embedded system 240 via network interfaces, e.g., without requiring network interface cards (NICs) on each system. In some embodiments, programmable hardware element 200 may provide a virtual network connection (VNC) between heterogeneous processors (e.g., an x86 processor on host system 220 and an ARM processor on embedded system 240), e.g., via a bus interface 202, programmable logic (e.g., such as an FPGA fabric, among other programmable hardware), and a bus interface 212. In some embodiments, the VNC may allow applications on each system to communicate via standard network application programming interfaces (APIs) without requiring corresponding hardware (e.g., network interface cards (NICs)) or Ethernet cabling between the host system and the embedded system. In some embodiments, programmable hardware element 200 may include bus interfaces 202 and 212. Bus interface 202 may interface with the host system 220, which may be a host system 120. Bus interface 212 may interface with the embedded system 240, which may be an embedded system 140. In some embodiments, bus interfaces 202 and 212 may operate according to distinct bus protocols. In other words, each bus interface of programmable hardware element 200 may support a particular type of bus distinct from buses supported by other bus interfaces of programmable hardware element 200. As shown, bus interface 202 may have multiple interfaces with a bus multiplexer 204. The bus multiplexer 204 may be a multi-function interface such that the host system 220 perceives (or detects) multiple devices operating at a single device slot. In some embodiments, a first function of the multi-function interface may be to provide an interface to a re-configurable (programmable) portion of the programmable hardware element 200 (e.g., to one or more configurable circuits included on the programmable hardware element 200, such as programmable logic 206). In some embodiments, a second function of the multi-function interface may be to allow access to (e.g., expose) a DMA engine 208. In some embodiments, DMA engine 208 may be configured to communicate with host system 220 (e.g., to allow transfer of data to and from host system 220). In addition, DMA engine 208 may be configured to communicate with DMA engine 210. DMA engine 210 may be configured to communicate with embedded system 240 (e.g., to allow transfer of data to and from embedded system 240), e.g., via bus interface 212. Thus, data may be transferred between the host system 220 and the embedded system 240 via programmable hardware element 200.

Figure 3:
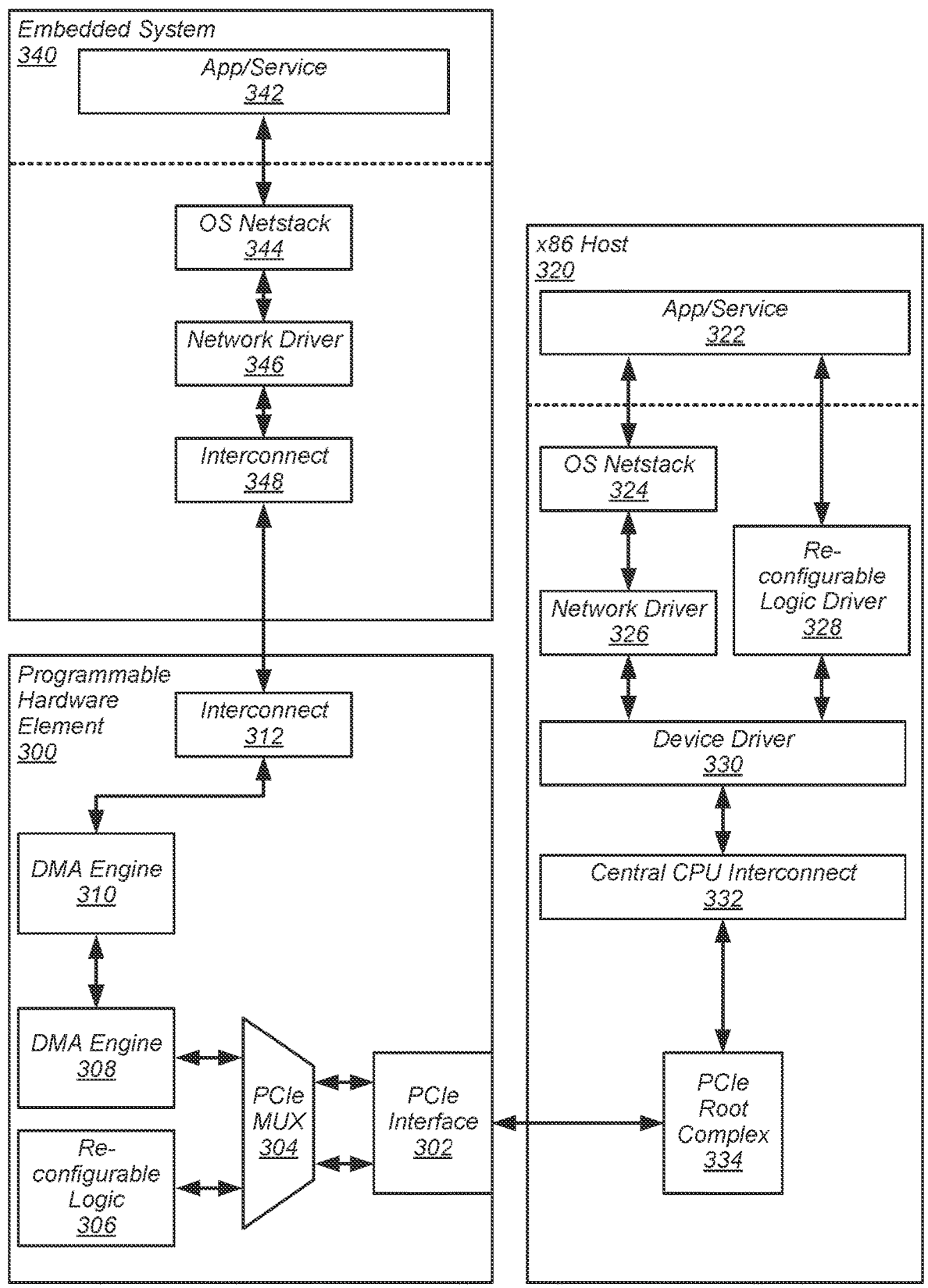
FIG. 3 illustrates an example of a block diagram of a distributed system, according to some embodiments.

FIG. 3 illustrates an example of a bock diagram of a distributed system, according to some embodiments. As shown, the distributed system may include an x86 host system 320, an embedded system 340, and a programmable hardware element 300. As shown, programmable hardware element 300, which may be a programmable hardware element 200 (and/or programmable hardware 100), may enable data transfer between embedded system 340 and x86 host system 320. In other words, programmable hardware element 300 may enable setup of a path for x86 host system 320 to communicate with embedded system 340 via network interfaces, e.g., without requiring network interface cards (NICs) on each device. In some embodiments, programmable hardware element 300 may provide a virtual network connection (VNC) between the heterogeneous systems (e.g., x86 host system 320 and embedded system 340), e.g., via a PCIe bus, FPGA fabric, and/or AXI buses. In some embodiments, the VNC may allow applications on each system to communicate via standard network application programming interfaces (APIs) without requiring corresponding hardware (e.g., network interface cards (NICs)) or Ethernet cabling between the x86 host system 320 and the embedded system 340.

As shown, programmable hardware element 300 may include a PCIe interface 302 to interface with x86 host system 320. PCIe interface 302 may communicate (e.g., via multiple paths) with a PCIe bus multiplexer 304. The PCIe bus multiplexer 304 may be a multi-function interface such that the x86 host system 320 perceives (or detects) multiple devices operating at a single device slot. In some embodiments, a first function of the multi-function interface may be to provide an interface to a re-configurable (programmable) portion of the programmable hardware element 300 (e.g., to one or more configurable circuits included on the programmable hardware element 300, such as reconfigurable logic 306). In some embodiments, a second function of the multi-function interface may be to allow access to (e.g., expose) a DMA engine 308. In some embodiments, DMA engine 308 may be configured to communicate with x86 host system 320 (e.g., to allow transfer of data to and from x86 host system 320). In addition, DMA engine 308 may be configured to communicate with DMA engine 310. DMA engine 310 may be configured to communicate with embedded system 340 (e.g., to allow transfer of data to and from embedded system 340), e.g., via interconnect 312. Thus, data may be transferred between the x86 host system 320 and the embedded system 340 via programmable hardware element 300.

As shown, the x86 host system 320 may include an application/service layer 322 that may communicate (interface) with an OS netstack 324 and a re-configurable logic driver 328. In some embodiments, the application/service layer 322 may perceive the embedded system 340 as a remote device on a local area network (LAN). In some embodiments, the application/service layer 322 may be able to communicate with the embedded system 340 (e.g., via programmable hardware element 300) via any network protocol supported by the OS netstack 324 (e.g., the host OS) and network driver 326 (e.g., network APIs), including, but not limited to, UDP, TCP/IP sockets, RPCs and/or SSH (e.g., via a command prompt/log in to the embedded system 340). In some embodiments, network driver 326 may act (or be configured as) a bridge between DMA engine 308 and OS netstack 324 (e.g., the OS network stack). In some embodiments, the network driver 326 may support functionality for (and/or be configured to support functionality for) device enumeration by OS services, device configuration by OS services and/or application/service layer (e.g., customer applications), and/or data transfer between the OS netstack 324 and device hardware (e.g., via device driver 330). In some embodiments, network driver 326 may implement (or be configured to implement) appropriate driver and network stack interfaces to act as a network device driver in a targeted OS and to act as an abstraction layer such that the OS and application/service layer perceives the embedded system 340 as a network device. As shown, network driver 326 may interface to a device driver 330. Device driver 330 may interface to a central CPU interconnect 332 which may allow access to PCIe root complex 334. PCIe root complex 334 interfaces with programmable hardware element 300 via PCIe interface 302.

As shown, the embedded system 340 may include an application/service layer 342 that may communicate (interface) with an OS netstack 344. In some embodiments, the application/service layer 342 may perceive the x86 host system 320 as a remote device on a local area network (LAN). In some embodiments, the application/service layer 342 may be able to communicate with the x86 host system 320 (e.g., via programmable hardware element 300) via any network protocol supported by the OS netstack 344 (e.g., the host OS) and network driver 346 (e.g., network APIs), including, but not limited to, UDP, TCP/IP sockets, RPCs and/or SSH. In some embodiments, network driver 346 may act (or be configured as) a bridge between DMA engine 310 and OS netstack 344 (e.g., the OS network stack). In some embodiments, the network driver 346 may support functionality for (and/or be configured to support functionality for) device enumeration by OS services, device configuration by OS services and/or application/service layer (e.g., customer applications), and/or data transfer between the OS netstack 344 and device hardware. In some embodiments, network driver 346 may implement (or be configured to implement) appropriate driver and network stack interfaces to act as a network device driver in a targeted OS and to act as an abstraction layer such that the OS and application/service layer perceives the x86 host system 320 as a network device. As shown, network driver 346 may interface to an interconnect 348. Interconnect 348 may interface with interconnect 312 of programmable hardware element 300.

FIG. 4 illustrates a block diagram of an example of a method for communicating between heterogenous processors via a programmable hardware element, according to some embodiments. The method shown in FIG. 4 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 402, a virtual network connection (VNC) between a host system, such as host system 120, and an embedded system, such as embedded system 140, via a programmable hardware element, such as programmable hardware 100, may be provided by a network driver implemented on the host system. In some embodiments, the host system may operate based on (and/or according to) a first operating system and/or a first processor architecture. In some embodiments, the embedded system may operate based on (and/or according to) a second operating system and/or a second processor architecture. In some embodiments, the first processor architecture may be an x86 processor architecture. In some embodiments, the second processor architecture may be an ARM processor architecture.

In some embodiments, the VNC may be established via bus interfaces between the host system and the programmable hardware element and the embedded system and the programmable hardware element. In some embodiments, a first bus interface between the host system and the programmable hardware element may differ from a second bus interface between the embedded system and the programmable hardware element. In some embodiments, the first bus interface may be a PCI and/or a PCIe bus. In some embodiments, the second bus interface may be an AXI (and/or an AXI4) bus interface.

In some embodiments, the network driver may provide functionality for device enumeration by operating system services of the host system. In some embodiments, the network driver may provide functionality for device configuration by operating system services. In some embodiments, the network driver may provide functionality for device configuration by user configured applications. In some embodiments, the network driver may provide functionality for device configuration by user created applications. In some embodiments, the network driver may provide functionality for data transfer between the host system and enumerated/configured devices. In some embodiments, the network driver may provide any, any combination of, and/or all of the described functionalities for the host system.

At 404, the host system may communicate with the embedded system via a network protocol over the bus interfaces with the programmable hardware element. In some embodiments, the programmable hardware element may implement a multi-function bus interface such that the programmable hardware element presents to the host system as a network interface and a re-programmable device. In some embodiments, a first path of the multi-function bus interface may provide direct memory access (DMA) between the host system and the programmable hardware element. The DMA (and/or a DMA engine implemented on the programmable hardware element) may allow (and/or enable) data to be transferred between the host system and the programmable hardware element. In some embodiments, a second path via the multi-function bus interface may provide the host system with access to a re-configurable portion of the programmable hardware element included on the programmable hardware element. In some embodiments, the first path provides the virtual network connection.

In some embodiments, the communication between the host system and the embedded system may be performed via a network protocol. For example, in some embodiments, the communication between the host system and the embedded system may be performed via user data protocol (UDP). As another example, in some embodiments, the communication between the host system and the embedded system may be performed via transport control protocol (TCP) sockets. In some embodiments, the communication between the host system and the embedded system may be performed via Internet protocol (IP) sockets. As a further example, in some embodiments, the communication between the host system and the embedded system may be performed via remote procedure calls (RPCs). As yet another example, in some embodiments, the communication between the host system and the embedded system may be performed via a secure shell (SSH), e.g., via a command prompt and/or a log into the embedded system.

In some embodiments, communicating with the embedded system may include transferring data (and/or other information, such as configuration and/or control information) to the embedded system and/or receiving data (and/or other information, such as configuration and/or control information) from the embedded system. In such embodiments, the communication may include sending, via the first path of the multi-function bus interface, data (and/or other information) to a first DMA engine on the programmable hardware element associated with the host system, transferring the data from the first DMA engine to a second DMA engine associated with the embedded system, and transferring, from the second DMA engine to the embedded system, the data. In some embodiments, the communication may include sending, to the second DMA engine, data from the embedded system, transferring, from the second DMA engine to the first DMA engine, the data, and sending, to the host system, the data via the first path of the multi-function bus interface.

FIG. 5 illustrates a block diagram of another example of a method for communicating between heterogenous processors via a programmable hardware element, according to some embodiments. The method shown in FIG. 5 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 502, a virtual network connection (VNC) between a host system, such as host system 120, and an embedded system, such as embedded system 140, via a programmable hardware element, such as programmable hardware 100, may be provided by a network driver implemented on the embedded system. In some embodiments, the host system may operate based on (and/or according to) a first operating system and/or a first processor architecture. In some embodiments, the embedded system may operate based on (and/or according to) a second operating system and/or a second processor architecture. In some embodiments, the first processor architecture may be an x86 processor architecture. In some embodiments, the second processor architecture may be an ARM processor architecture.

In some embodiments, the VNC may be established via bus interfaces between the host system and the programmable hardware element and the embedded system and the programmable hardware element. In some embodiments, a first bus interface between the host system and the programmable hardware element may differ from a second bus interface between the embedded system and the programmable hardware element. In some embodiments, the first bus interface may be a PCI and/or a PCIe bus. In some embodiments, the second bus interface may be an AXI (and/or an AXI4) bus interface.

In some embodiments, the network driver may provide functionality for device enumeration by operating system services of the embedded system. In some embodiments, the network driver may provide functionality for device configuration by operating system services. In some embodiments, the network driver may provide functionality for device configuration by user configured applications. In some embodiments, the network driver may provide functionality for device configuration by user created applications. In some embodiments, the network driver may provide functionality for data transfer between the embedded system and enumerated/configured devices. In some embodiments, the network driver may provide any, any combination of, and/or all of the described functionalities for the host system.

At 504, the embedded system may communicate with the host system via a network protocol over a bus interface with the programmable hardware element. In some embodiments, the programmable hardware element may implement a multi-function bus interface such that the programmable hardware element presents to the host system as a network interface and a re-programmable device. In some embodiments, a first path of the multi-function bus interface may provide direct memory access (DMA) between the host system and the FPGA, The DMA (and/or a DMA engine implemented on the programmable hardware element) may allow (and/or enable) data to be transferred between the host system and the programmable hardware element. In some embodiments, a second path via the multi-function bus interface may provide the host system with access to a re-configurable portion of programmable hardware element included on the programmable hardware element. In some embodiments, the first path provides the virtual network connection.

In some embodiments, the communication between the host system and the embedded system may be performed via a network protocol. For example, in some embodiments, the communication between the host system and the embedded system may be performed via user data protocol (UDP). As another example, in some embodiments, the communication between the host system and the embedded system may be performed via transport control protocol (TCP) sockets. In some embodiments, the communication between the host system and the embedded system may be performed via Internet protocol (IP) sockets. As a further example, in some embodiments, the communication between the host system and the embedded system may be performed via remote procedure calls (RPCs). As yet another example, in some embodiments, the communication between the host system and the embedded system may be performed via a secure shell (SSH), e.g., via a command prompt and/or a log into the embedded system.

In some embodiments, communicating with the embedded system may include transferring data (and/or other information, such as configuration and/or control information) to the embedded system and/or receiving data (and/or other information, such as configuration and/or control information) from the embedded system. In such embodiments, the communication may include sending, via the first path of the multi-function bus interface, data (and/or other information) to a first DMA engine on the programmable hardware element associated with the host system, transferring the data from the first DMA engine to a second DMA engine associated with the embedded system, and transferring, from the second DMA engine to the embedded system, the data. In some embodiments, the communication may include sending, to the second DMA engine, data from the embedded system, transferring, from the second DMA engine to the first DMA engine, the data, and sending, to the host system, the data via the first path of the multi-function bus interface.

FIG. 6 illustrates a block diagram of another example of a method for communicating between heterogenous processors via a programmable hardware element, according to some embodiments. The method shown in FIG. 6 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 602, a programmable hardware element, such as programmable hardware 100, may receive data from a first system over a first bus interface. The data may be received via a network communication protocol. In some embodiments, the data may be intended to be delivered to a second system. In some embodiments, a virtual network connection (VNC) between the first system and the second system may be provided by a first network driver implemented on the first system and a second network driver implemented on the second system. In some embodiments, the first system may operate based on (and/or according to) a first operating system and/or a first processor architecture. In some embodiments, the second system may operate based on (and/or according to) a second operating system and/or a second processor architecture. In some embodiments, the first processor architecture may be one of an x86 processor architecture or an ARM processor architecture and the second processor architecture may the other one of an x86 processor architecture or an ARM processor architecture. In some embodiments, the first system may be a host system, such as host system 120, or an embedded system, such as embedded system 140, and the second system may be the other one of a host system or an embedded system.

In some embodiments, the VNC may be established via bus interfaces between the first system and the programmable hardware element and the second system and the programmable hardware element. In some embodiments, a first bus interface between the first system and the programmable hardware element may differ from a second bus interface between the embedded system and the programmable hardware element. In some embodiments, one of the first bus interface or second bus may be a PCI and/or a PCIe bus and the other one of the first bus interface or the second bus interface may be an AXI (and/or an AXI4) bus interface.

In some embodiments, the network driver may provide functionality for device enumeration by operating system services of the supported system (e.g., the first or second system). In some embodiments, the network driver may provide functionality for device configuration by operating system services. In some embodiments, the network driver may provide functionality for device configuration by user configured applications. In some embodiments, the network driver may provide functionality for device configuration by user created applications. In some embodiments, the network driver may provide functionality for data transfer between the supported system and enumerated/configured devices. In some embodiments, the network driver may provide any, any combination of, and/or all of the described functionalities for the host system.

At 604, the data may be transferred, via the second bus interface to the second system via the network protocol. In some embodiments, the programmable hardware element may implement a multi-function bus interface such that the programmable hardware element presents to one of the systems as a network interface and a re-programmable device. In some embodiments, a first path of the multi-function bus interface may provide direct memory access (DMA) between the system and the FPGA. The DMA (and/or a DMA engine implemented on the programmable hardware element) may allow (and/or enable) data to be transferred between the system and the programmable hardware element. In some embodiments, a second path via the multi-function bus interface may provide the system with access to a re-configurable portion of programmable hardware element fabric included on the programmable hardware element. In some embodiments, the first path provides the virtual network connection.

In some embodiments, the communication between the first system and the second system may be performed via user data protocol (UDP). In some embodiments, the communication between the first system and the second system may be performed via transport control protocol (TCP) sockets. In some embodiments, the communication between the first system and the second system may be performed via Internet protocol (IP) sockets. In some embodiments, the communication between the first system and the second system may be performed via remote procedure calls (RPCs). In some embodiments, the communication between the first system and the second system may be performed via a secure shell (SSH), e.g., via a command prompt and/or a log into the one of the systems.

In some embodiments, transfer of the data (and/or other information, such as configuration and/or control information) between the first and second systems may include transferring data received from the first system by a first DMA engine of the programmable hardware element to a second DMA engine of the programmable hardware element and transferring the data from the second DMA to the second system.

Figure 7:
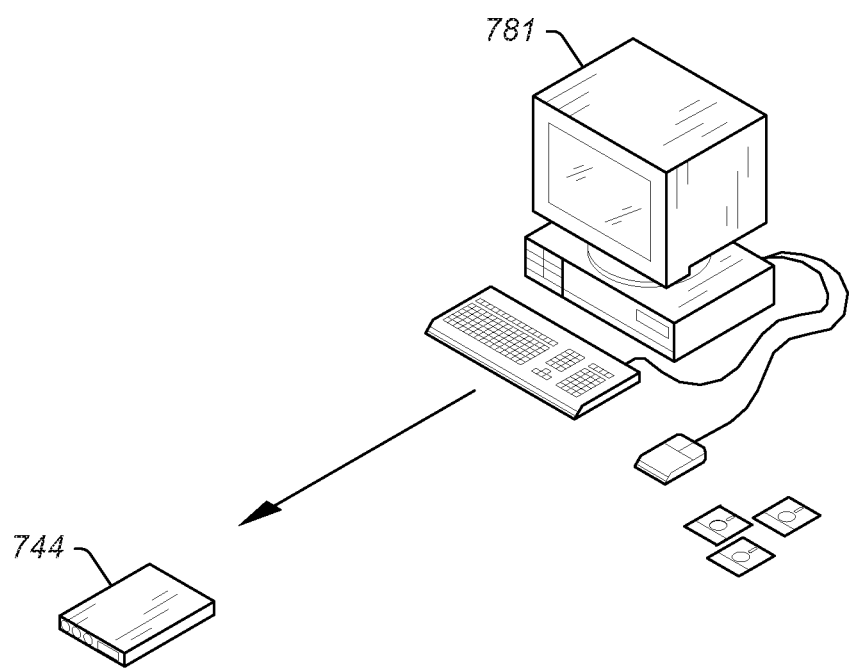
FIG. 7 illustrates an exemplary system which may perform control and/or simulation functions utilizing graphical programs, according to some embodiments.

FIG. 7—Exemplary System

Various embodiments disclosed herein may be involved with performing test and/or measurement functions; controlling and/or modeling instrumentation or industrial automation hardware; modeling and simulation functions, e.g., modeling or simulating a device or product being developed or tested, etc. Exemplary test applications where embodiments may be used include hardware-in-the-loop testing and rapid control prototyping, among others. However, it is noted that various embodiments may be used for a plethora of applications and is not limited to the above applications. In other words, applications discussed in the present description are exemplary only, and the disclosed embodiments may be used in any of various types of systems. Thus, embodiments of the system and method disclosed herein may be configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

For example, FIG. 7 illustrates an exemplary system which may perform control and/or simulation functions. As shown, a controller may be implemented by a computer system 781 or other device (e.g., including a processor and memory medium and/or including a programmable hardware element). In some embodiments, the computer system 781 may execute and/or implement a graphical program. In some embodiments, computer system 781 may be a host system 120 and/or an embedded system 140. The computer system 781 may communication with a device 744 that may include a processor and memory medium and/or one or more programmable hardware elements. In some embodiments, device 744 may execute and/or implement a graphical program, and/or may be implemented in and/or as a real physical system, e.g., such as a car engine. In some embodiments, device 744 may be programmable hardware 100. In some embodiments, device 744 may include programmable hardware 100 and embedded system 140.

Figure 8:
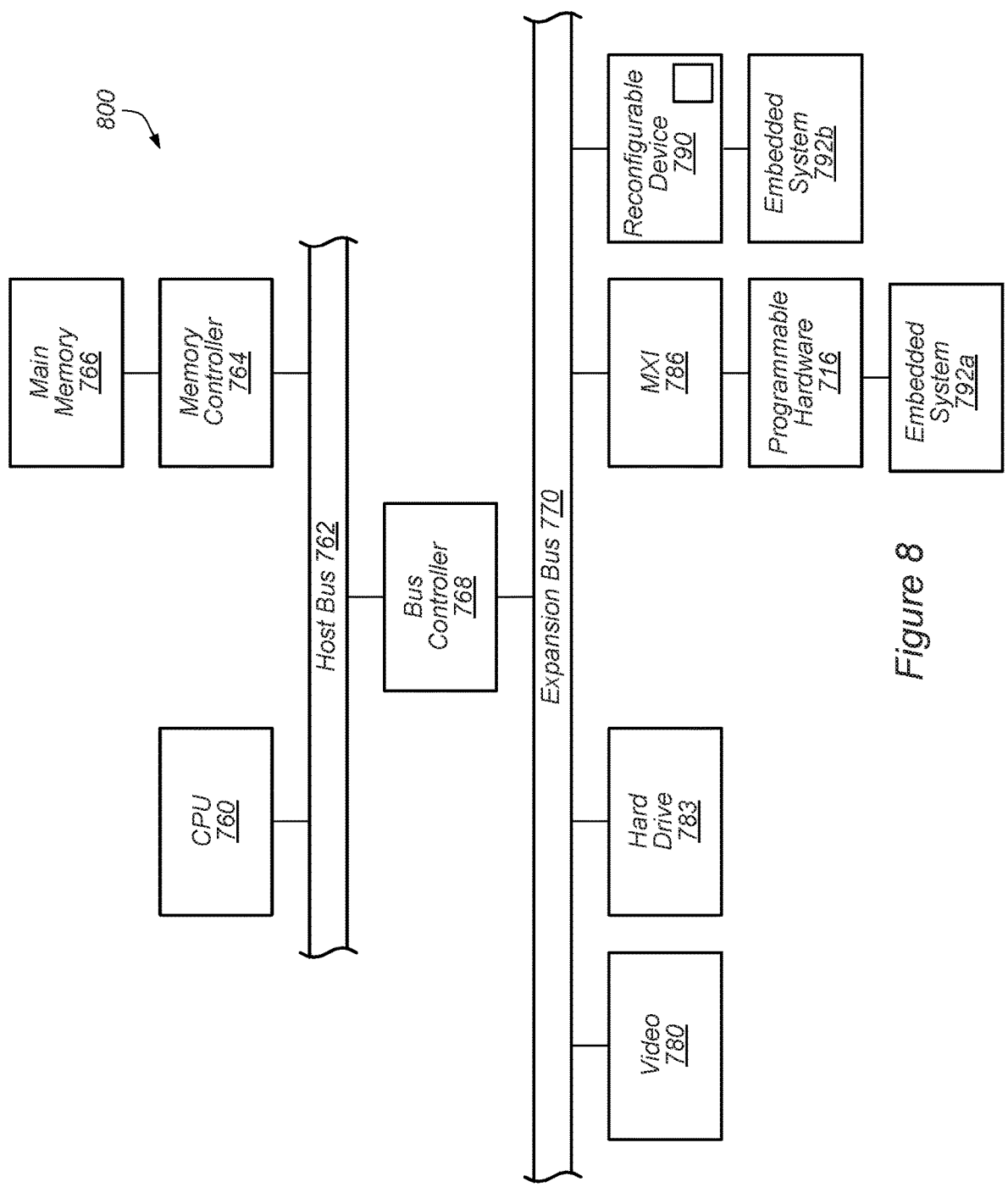
FIG. 8 illustrates an exemplary block diagram of the computer system of FIG. 7, according to some embodiments.

FIG. 8—Computer System Block Diagram

FIG. 8 is a block diagram 800 representing an embodiment of the computer system 781 in FIG. 7. It is noted that any type of computer system configuration or architecture can be used as desired, and FIG. 7 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 760 which is coupled to a processor or host bus 762. The CPU 760 may be any of various types, including an x86 processor, e.g., a Pentium class, a PowerPC processor, an Intel® Core™ i7 class, a CPU from the SPARC family of RISC processors, as well as others. A memory medium, typically comprising RAM and referred to as main memory, 766 is coupled to the host bus 762 by means of memory controller 764. The main memory 766 may store one or more programs implementing the techniques disclosed herein. The main memory may also store operating system software, as well as other software for operation of the computer system.

The host bus 762 may be coupled to an expansion or input/output bus 770 by means of a bus controller 768 or bus bridge logic. The expansion bus 770 may be the PCI (Peripheral Component Interconnect) expansion bus, although other bus types can be used. The expansion bus 770 includes slots for various devices. The computer 781 further comprises a video display subsystem 780 and hard drive 783 coupled to the expansion bus 770. The computer 781 may also comprise an MXI device 786 coupled to a programmable hardware 716 (e.g., which may be a programmable hardware 100).

The programmable hardware 716 may include a processor and memory which may execute a real time operating system. The programmable hardware 716 may also or instead comprise a programmable hardware element. The computer system may be configured to deploy a (possibly graphical) program to the programmable hardware 716 for execution of the program on the programmable hardware 716. In some embodiments, the deployed program may be a graphical program, and may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Alternatively, the program may be a textual program.

As shown, a reconfigurable device 790 (e.g., which may be a programmable hardware 100) may also be connected to the computer. The reconfigurable device 790 may include a processor and memory which may execute a real time operating system. The reconfigurable device 790 may also or instead comprise a programmable hardware element. The computer system may be configured to deploy a (possibly graphical) program to the reconfigurable device 790 for execution of the program on the reconfigurable device 790. In some embodiments, the deployed program may be a graphical program, and may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Alternatively, the program may be a textual program.

In some embodiments, as shown, either and/or both of programmable hardware 716 and/or reconfigurable device 790 may be connected to (and/or in communication with) an embedded system, such as embedded system 792*a* and/or embedded system 792*b* (e.g., each of which may be an embedded system 140). In some embodiments, one or both of embedded system 792*a* and/or embedded system 792*b* may communicate with computer system 781 via a virtual network connection supported by one of programmable hardware 716 and/or reconfigurable device 790, e.g., as described herein.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs and/or FPGA fabrics.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A programmable hardware element, comprising:
   a first one or more circuits configured as a first bus interface, wherein the first bus interface comprises a multi-function bus interface, wherein the multi-function bus interface operates according to a peripheral component interconnect express (PCIe) bus;
   a second one or more circuits configured as a first direct memory access (DMA) engine associated with a first system via a first path of the multi-function bus interface;
   a third one or more circuits configured as a second DMA engine associated with a second system;
   a fourth one or more circuits configured as a second bus interface; and
   a fifth one or more circuits configured as a reconfigurable logic device associated with the first system via a second path of the multi-function bus interface, wherein the first system accesses the reconfigurable logic device via a reconfigurable logic driver;
   wherein the programmable hardware element is configured to:
      receive, via the first path of the multi-function bus interface, first information from the first system into the first DMA engine, wherein the first information is received according to a network communications protocol, wherein the network communications protocol includes at least one of user data protocol (UDP), transport control protocol (TCP) sockets, Internet protocol (IP) sockets, remote procedure calls (RPCs), or a secure shell (SSH), and wherein the multi-function bus interface allows the programmable hardware element to appear as a network device and the reconfigurable logic device to the first system;
      transfer the first information to the second DMA engine; and
      send, to the second system, the first information via the second bus interface, wherein the first information is sent according to the network communications protocol.

2. The programmable hardware element of claim 1, wherein the first system and the second system operate based on differing operating systems.

3. The programmable hardware element of claim 1, wherein the second bus comprises an Advanced eXtensible Interface (AXI) bus.

4. The programmable hardware element of claim 1, wherein the first system operates according to an x86 processor architecture, and wherein the second system operates according to a reduced instruction set computing architecture (RISC).

5. The programmable hardware element of claim 1, wherein the multi-function allows the first system and the second system to communicate via network application programming interfaces (APIs) without requiring corresponding network interface cards (NICs).

6. The programmable hardware element of claim 1, wherein the multi-function allows the first system and the second system to communicate via network application programming interfaces (APIs) without requiring corresponding Ethernet cabling between the first system and the second system.

7. A non-transitory computer readable memory medium storing program instructions executable by processing circuitry of a first computer system to:
   provide a virtual network connection to a second computer system, wherein the first computer system and the second computer system operate based on differing processor architectures, wherein the virtual network connection is via programmable hardware in communication via bus interfaces with the first and second computer systems; and
   send, via a network communications protocol, first information to the second computer system via the programmable hardware, wherein the programmable hardware implements a multi-function bus interface such that the programmable hardware presents as a network interface via a first path of the multi-function bus interface and a reconfigurable logic device via a second path of the multi-function bus interface, wherein the multi-function bus interface operates according to a peripheral component interconnect express (PCIe) bus, and wherein the network communications protocol comprises at least one of user data protocol (UDP), transport control protocol (TCP) sockets, Internet protocol (IP) sockets, remote procedure calls (RPCs), or a secure shell (SSH).

8. The non-transitory computer readable memory medium of claim 7,
   wherein the program instructions are further executable to provide functionality for one or more of:
      device enumeration by operating system services of the first computer system;
      device configuration by operating system services;
      device configuration by user configured applications;
      device configuration by user created applications; or
      data transfer between the first computer system and enumerated or configured devices.

9. The non-transitory computer readable memory medium of claim 7,
wherein a first path of the multi-function bus interface provides direct memory access between the first computer system and the programmable hardware, thereby allowing the first information to be transferred between the first computer system and the programmable hardware.

10. The non-transitory computer readable memory medium of claim 9,
wherein a second path via the multi-function bus interface provides the first computer system with access to a configurable portion of the programmable hardware.

11. The non-transitory computer readable memory medium of claim 9,
wherein the first path provides the virtual network connection.

12. The non-transitory computer readable memory medium of claim 7,
wherein to send the first information to the second computer system, the program instructions are further executable to cause the first computer system to:
send, via a first path of the multi-function bus interface, data to a first direct memory access (DMA) engine on the programmable hardware, wherein the first DMA engine is associated with the first computer system.

13. The non-transitory computer readable memory medium of claim 7,
wherein the first system and the second system operate based on differing operating systems.

14. The non-transitory computer readable memory medium of claim 7,
wherein the multi-function allows the first computer system and the second computer system to communicate via network application programming interfaces (APIs) without requiring corresponding network interface cards (NICs).

15. A non-transitory computer readable memory medium storing program instructions executable by processing circuitry of a first computer system to:
provide a virtual network connection to a second computer system, wherein the first computer system and the second computer system operate based on differing processor architectures, wherein the virtual network connection is via a field programmable gate array (FPGA) fabric in communication via bus interfaces with the first and second computer systems; and
send, via a network communications protocol, first information to the second computer system via the FPGA fabric, wherein the FPGA fabric implements a multi-function bus interface with the first computer system such that the FPGA fabric presents to the first computer system as a reconfigurable logic device via a first path of the multi-function bus interface and a network interface via a second path of the multi-function bus interface, wherein the multi-function bus operates according to a peripheral component interconnect express (PCIe) bus, and wherein the network communications protocol comprises at least one of user data protocol (UDP), transport control protocol (TCP) sockets, Internet protocol (IP) sockets, remote procedure calls (RPCs), or a secure shell (SSH).

16. The non-transitory computer readable memory medium of claim 15,
wherein the program instructions are further executable to provide functionality for one or more of:
device enumeration by operating system services of the first computer system;
device configuration by operating system services;
device configuration by user configured applications;
device configuration by user created applications; or
data transfer between the first computer system and enumerated or configured devices.

17. The non-transitory computer readable memory medium of claim 15,
wherein the bus interface provides direct memory access between the first computer system and the FPGA fabric, thereby allowing the first information to be transferred between the first computer system and the FPGA fabric.

18. The non-transitory computer readable memory medium of claim 15,
wherein to send the first information to the second computer system, the program instructions are further executable to cause the first computer system to:
send, via the bus interface, the first information to a first direct memory access (DMA) engine on the FPGA fabric, wherein the first DMA engine is associated with the first computer system.

19. The non-transitory computer readable memory medium of claim 15,
wherein the first computer system operates according to a reduced instruction set computing architecture, and wherein the second system operates according to an x86 processor architecture.

20. The non-transitory computer readable memory medium of claim 15,
wherein the multi-function allows the first computer system and the second computer system to communicate via network application programming interfaces (APIs) without requiring corresponding network interface cards (NICs).

* * * * *